United States Patent

Kobayashi et al.

[11] Patent Number: 5,988,486
[45] Date of Patent: Nov. 23, 1999

[54] METHOD OF CONTROLLING ELECTRODE FORCE OF SPOT WELDING GUN

[75] Inventors: Nobuo Kobayashi; Toshiaki Nagasawa; Hisaya Watanabe; Kouji Oda; Isao Bundou, all of Saitama-ken, Japan

[73] Assignee: Honda Giken Kogyo Kabushiki Kaisha, Tokyo, Japan

[21] Appl. No.: 09/028,459

[22] Filed: Feb. 24, 1998

[30] Foreign Application Priority Data

| Mar. 11, 1997 | [JP] | Japan | 9-056404 |
| Mar. 11, 1997 | [JP] | Japan | 9-056405 |
| Mar. 11, 1997 | [JP] | Japan | 9-056406 |

[51] Int. Cl.⁶ ............... B23K 5/22; B23K 1/00; B23K 9/12; B23K 37/02
[52] U.S. Cl. .................. 228/212; 228/102; 219/86.61; 219/86.7
[58] Field of Search ............... 219/86.61, 86.7, 219/86.33, 86.41, 86.51; 228/102, 7, 10, 45

[56] References Cited

U.S. PATENT DOCUMENTS

| 4,447,697 | 5/1984 | Dunne et al. | 219/86.41 |
| 5,340,960 | 8/1994 | Takasaki et al. | 219/86.41 |
| 5,449,875 | 9/1995 | Ito et al. | 219/86.41 |
| 5,898,285 | 4/1999 | Nagasawa et al. | 318/568.13 |

FOREIGN PATENT DOCUMENTS

| 5-18774 | 3/1963 | Japan . |
| 6-328267 | 11/1994 | Japan . |
| 983626 | 1/1965 | United Kingdom . |
| 2242847 | 10/1991 | United Kingdom . |

*Primary Examiner*—Patrick Ryan
*Assistant Examiner*—Cecilia Newsome
*Attorney, Agent, or Firm*—Armstrong, Westerman, Hattori, McLeland & Naughton

[57] ABSTRACT

In a spot welding gun which is made up of a gun main body which is operated for equalization by a driving source, a stationary electrode tip which is immovable relative to the gun main body, and a movable electrode tip which is connected to a pressing source, both electrode tips are pressed to a workpiece with an even force, to thereby perform a high quality spot welding. The driving source is controlled such that the electrode force of the stationary electrode tip, by the driving source, to the workpiece becomes substantially zero. In this manner, there occurs no difference in the electrode forces by both the electrode tips to the workpiece.

7 Claims, 9 Drawing Sheets

METHOD OF CONTROLLING ELECTRODE FORCE OF SPOT WELDING GUN

BACKGROUND OF THE INVENTION

1. Field of the Invention

The present invention relates to a method of controlling an electrode force to be applied to a welding gun for spot welding (hereinafter called a spot welding gun) which is used mainly by mounting it on a robot.

2. Description of the Related Art

As this kind of spot welding gun, there has hitherto been known one as disclosed in Japanese Published Unexamined Patent Application No. 328267/1994. Namely, on a gun main body there are provided a stationary electrode tip which is immovable relative to the gun main body, and a movable electrode tip which is operated by a pressing (or pressurizing) source (i.e., a source for applying an electrode force) to open and close relative to the stationary electrode tip. The gun main body is arranged to be movable relative to a gun support bracket, by means of a driving source, in a direction in which both the electrode tips look toward each other.

In the above-described conventional spot welding gun, the movable electrode tip can be brought into contact with a workpiece by the pressing source, and the stationary electrode tip can be contacted with the workpiece by the movement of the gun main body by means of the driving source, whereby a so-called equalizing function can be obtained.

In the above-described spot welding gun, the electrode force of the pressing source functions or operates equally on the movable electrode tip and on the stationary electrode tip via the gun main body. However, the electrode force by the driving source is added to the stationary electrode tip. In particular, when the relative position of the workpiece relative to the spot welding gun deviates toward the stationary electrode tip due to an error in the setting position of the workpiece or to an error in positioning the robot, the electrode force to be added to the stationary welding gun increases. As a result, there will occur an increase in the difference between the electrode force of the stationary electrode tip to the workpiece and the electrode force of the movable electrode tip to the workpiece.

Figure 9:
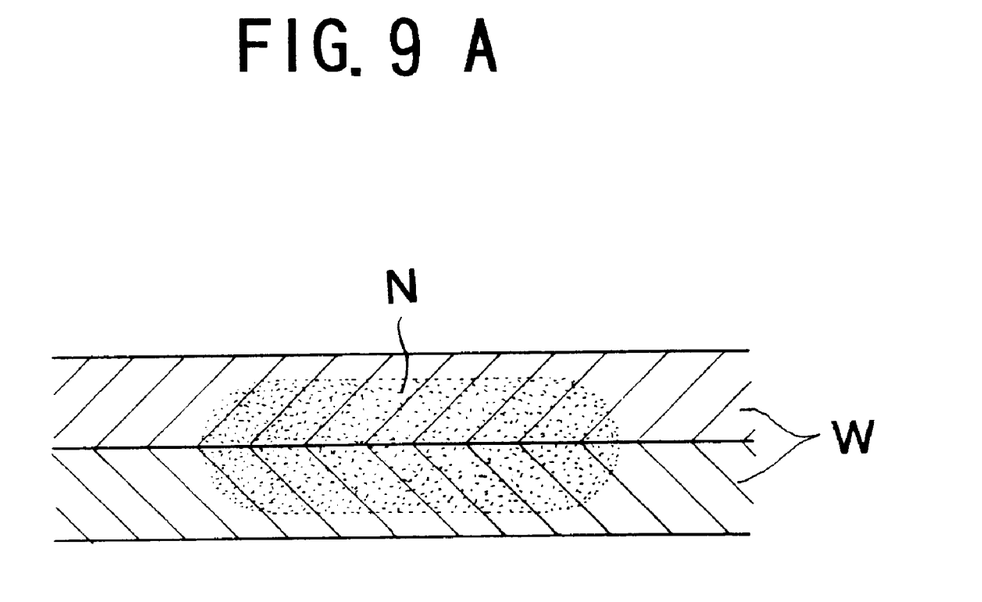
FIG. 9A is a schematic cross-sectional view of a nugget which is formed when there is no difference in electrode forces between movable and stationary electrodes.
FIG. 9B is a schematic cross-sectional view of a nugget which is formed when there is a difference in electrode forces therebetween.

If a difference occurs between the electrode forces of both the electrode tips, the contact resistance between the electrode tip of the smaller electrode force and the workpiece becomes larger than the contact resistance between the electrode tip of the larger electrode force and the workpiece. Therefore, the center of heat generation of the workpiece during electric charging deviates toward the electrode tip of the smaller electrode force. Consequently, as shown in FIG. 9B, the portion with the largest diameter portion of a nugget N (i.e., that portion of the workpiece which is melted by heat generation through resistance) deviates toward the electrode tip of the smaller electrode force (upper side in the figure). The diameter of the nugget at the welded surfaces of the workpiece W thus becomes smaller, and the shear weld strength of the workpiece W lowers. Further, if the welding electric current is increased so that the diameter of the nugget at the welded surfaces of the workpiece W attains a predetermined value, the upper sheet of the workpiece W melts excessively, with the result that spatters splash around and/or the electrode tip adheres to the workpiece through melting. In this specification, the workpiece W is exemplified to be made up of an upper sheet (referred to as W) and a lower sheet (also referred to as W). Unless otherwise defined, the term "workpiece W" is normally intended to cover the combination of the upper sheet and the lower sheet.

In view of the above-described points, the present invention has an object of providing a method of controlling an electrode force of a spot welding gun in which the electrode force of the stationary electrode tip and the electrode force of the movable electrode tip are equalized so that welding of high quality can be performed without giving rise to spattering and/or adhesion of the electrode tips with the workpiece through melting.

SUMMARY OF THE INVENTION

In order to attain the above and other objects, the present invention is a method of controlling an electrode force of a spot welding gun, the spot welding gun comprising: a gun main body; a stationary electrode tip which is immovable relative to the gun main body; and a movable electrode tip which is opened and closed by a pressing source relative to the stationary electrode tip, the gun main body being movable relative to a gun support bracket by a driving source in a direction in which both the electrode tips lie opposite to each other. The method comprises the steps of: controlling the pressing source such that the movable electrode tip is moved by the pressing source from an open position in a closing direction of approaching a workpiece to thereby bring the movable electrode tip into contact with the workpiece and, thereafter, that a predetermined electrode force is obtained; and controlling the driving source such that a difference between an electrode force of the stationary electrode tip to the workpiece and the electrode force of the movable electrode tip to the workpiece at the time of pressing the workpiece becomes substantially zero.

According to the present invention, the electrode force of the stationary electrode tip to the workpiece and the electrode force of the movable electrode tip to the workpiece become equal. Therefore, the contact resistances between the workpiece and both the electrode tips become equal, with the result that the center of heat generation during the electric charging coincides with the welded surfaces of the workpiece. Consequently, a nugget is formed such that it attains a maximum diameter at the welded surfaces of the workpiece. A high-quality welding of high weld shear strength can thus be performed with a smaller possibility of spattering and/or adhesion of the electrode tips with the workpiece through melting.

It is conceivable to employ the following arrangement. Namely, sensors such as load cells, or the like for detecting the electrode force of the stationary electrode tip and the electrode force of the movable electrode tip, respectively, are provided. Based on the signals from those sensors, the driving source is controlled such that the difference between the electrode forces of both the electrode tips becomes zero. However, it is desirable, from the viewpoint of cost, to control the driving source such that the difference between the electrode forces becomes zero without using such sensors.

As such a method, there are a first method and a second method as described hereinbelow. Namely, in the first method, the driving source is controlled by: moving the stationary electrode tip by the movement of the gun main body by means of the driving source from an open position in a closing direction of approaching the workpiece to thereby bring the stationary electrode tip into contact with the workpiece; detecting a point of time of contact of the stationary electrode tip with the workpiece; and holding the gun main body to a position at the point of time of the contact. In the second method, the driving source is controlled by: moving the stationary electrode tip by a movement of the gun main body by means of the driving source from an open position in a closing direction of approaching the workpiece; stopping the gun main body when the stationary electrode tip has reached a landing start position which is away from the workpiece by a predetermined distance; and switching a driving force of the driving source to a value which is both necessary and sufficient to support a weight of the gun main body and holding the driving force to that value.

According to the first method, since the stationary electrode tip is held to the position at the point of time of contact of the stationary electrode tip with the workpiece, the contact pressure of the stationary electrode tip to the workpiece by the driving source becomes extremely small. Therefore, the electrode force of the stationary electrode to the workpiece becomes only that pressing reaction force of the movable electrode tip to the workpiece which operates thereon via the gun main body. As a consequence, the electrode forces of both the electrode tips to the workpiece become equal to each other.

In order to detect the point of time of contact of the stationary electrode tip with the workpiece, it is preferable to employ the following steps. Namely, the steps comprise: setting an upper limit value of a driving force of the driving source to such a value that the movement of the gun main body is restrained when the stationary electrode tip has slightly contacted the workpiece; detecting a speed of movement of the gun main body; and detecting a point of time at which the speed of movement becomes zero as the point of time of contact of the stationary electrode tip with the workpiece. Or else, the steps comprise: detecting a driving load of the driving source; and detecting the point of time of increase in the driving load as a point of time of contact of the stationary electrode tip with the workpiece.

Further, it is preferable to employ the following further steps of: setting a landing start position for each of the stationary electrode tip and the movable electrode tip, the landing start position being away from the workpiece by a predetermined distance; moving the stationary electrode tip and the movable electrode tip in the closing direction from respective open positions; after both the electrode tips have reached respective landing start positions, moving the stationary electrode tip in the closing direction at a predetermined set speed which is lower than a moving speed before it reached the landing start position; and moving the movable electrode tip in the closing direction relative to the gun main body at a relative speed which is equal to the set speed.

Here, the speed of movement of the movable electrode tip relative to the workpiece becomes a speed which is obtained by subtracting the speed of movement of the gun main body, i.e., of the stationary electrode tip from the speed of movement of the movable electrode tip relative to the gun main body. Therefore, if the speed is controlled as described above, the movable electrode tip does not move from the landing start position until the stationary electrode tip comes into contact with the workpiece and its movement is thereby stopped. And, after the stationary electrode tip has come into contact with the workpiece, the movable electrode tip moves relative to the workpiece at the set speed to thereby contact the workpiece. In this manner, since the movable electrode tip contacts the workpiece after the stationary electrode tip has contacted the workpiece, the deformation of the workpiece by the striking of the workpiece by the movable electrode tip can be surely prevented. Further, by closing each of the electrode tips at a relatively high speed up to the landing start position, the time required for controlling the electrode force can be shortened, thereby improving the efficiency of the welding work.

According to the second method, by switching the driving force of the driving source to the above-described value, the driving force becomes equal to the driving load by the weight of the gun main body. As a result, the driving source is restrained and the gun main body ceases to move. Thereafter, when the movable electrode tip comes into contact with the workpiece, the load which operates on the driving source is reduced by the contact reaction force, and the restraining of the driving source is released. Consequently, the gun main body, i.e., the stationary electrode tip moves from the landing start position at a speed that is equal to the speed of movement of the movable electrode tip relative to the gun main body to thereby contact the workpiece.

Here, since the force which is transmitted from the driving source to the gun main body is canceled by the weight of the gun main body, the electrode force of the stationary electrode tip, by the driving source, to the workpiece becomes substantially zero. Therefore, the electrode force of the movable electrode tip to the workpiece becomes only that pressing reaction force on the workpiece by the movable electrode tip which operates via the gun main body. The pressing reaction forces of both the electrode tips to the workpiece thus become equal to each other.

In order to prevent the deformation of the workpiece due to the striking by the movable electrode tip, it becomes necessary to contact the movable electrode tip with the workpiece at a low speed. However, if the movable electrode tip is closed from the open position at a low speed, it takes much time. On the other hand, if the following steps are employed, the deformation of the workpiece can be prevented and the time required for pressing (or applying an electrode force) can advantageously be shortened to the smallest extent possible. The steps in question are: setting a landing start position for the movable electrode tip, the landing start position being away from the workpiece by a predetermined distance; moving the stationary electrode tip and the movable electrode tip from the respective open positions in the closing direction; and after both the electrode tips have reached respective landing start positions, moving the movable electrode tip in the closing direction at a predetermined set speed which is lower than a moving speed before it reached the landing start position.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
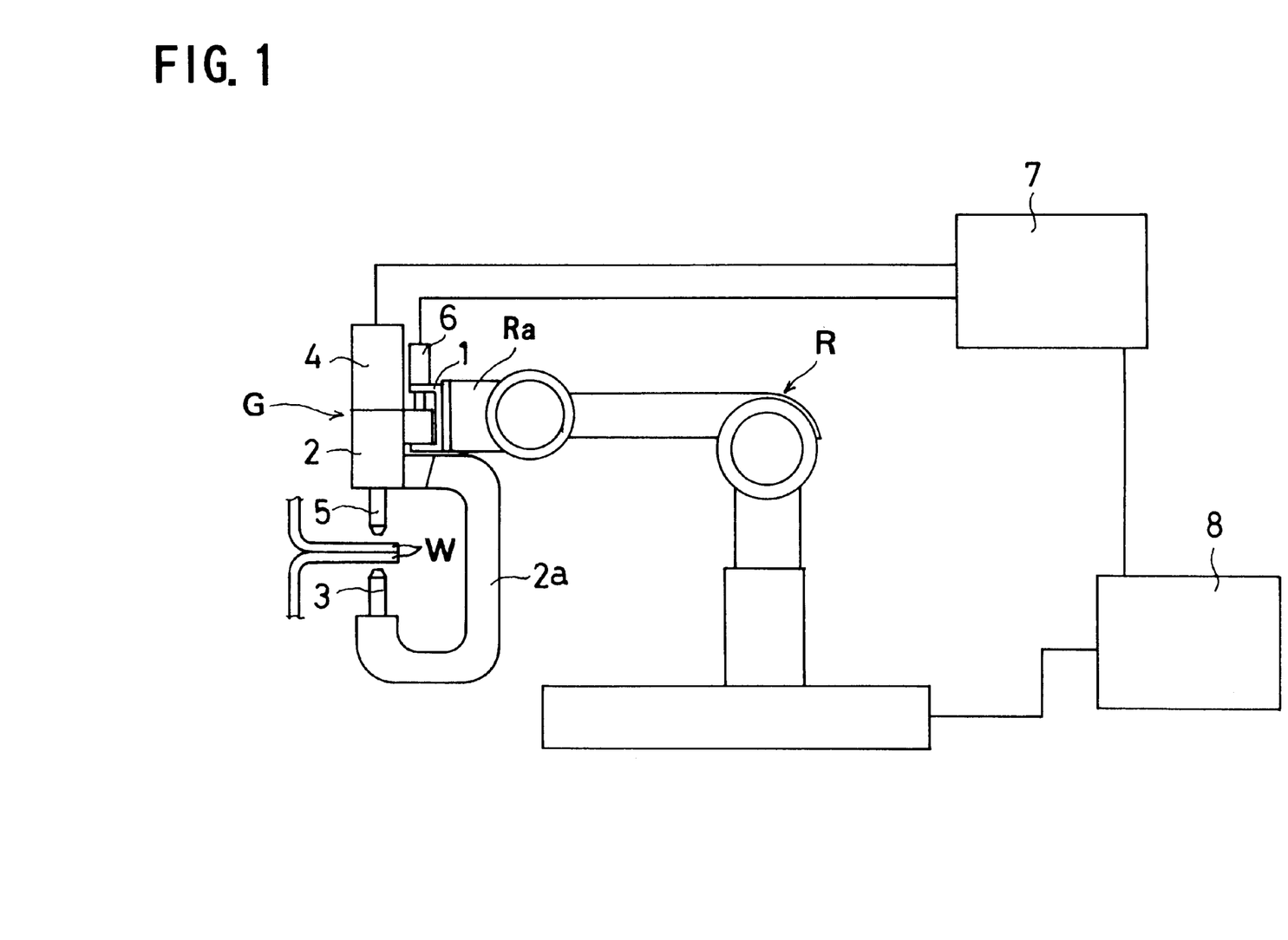
FIG. 1 is a side view of a robot which has mounted thereon a spot welding gun equipped with the apparatus for carrying into effect the method of the present invention.

With reference to FIG. 1, reference letter R denotes a robot for performing welding of a workpiece W. A welding gun G for spot welding (also called a spot welding gun G) is attached to a wrist Ra on an operating end of the robot R.

Figure 2:
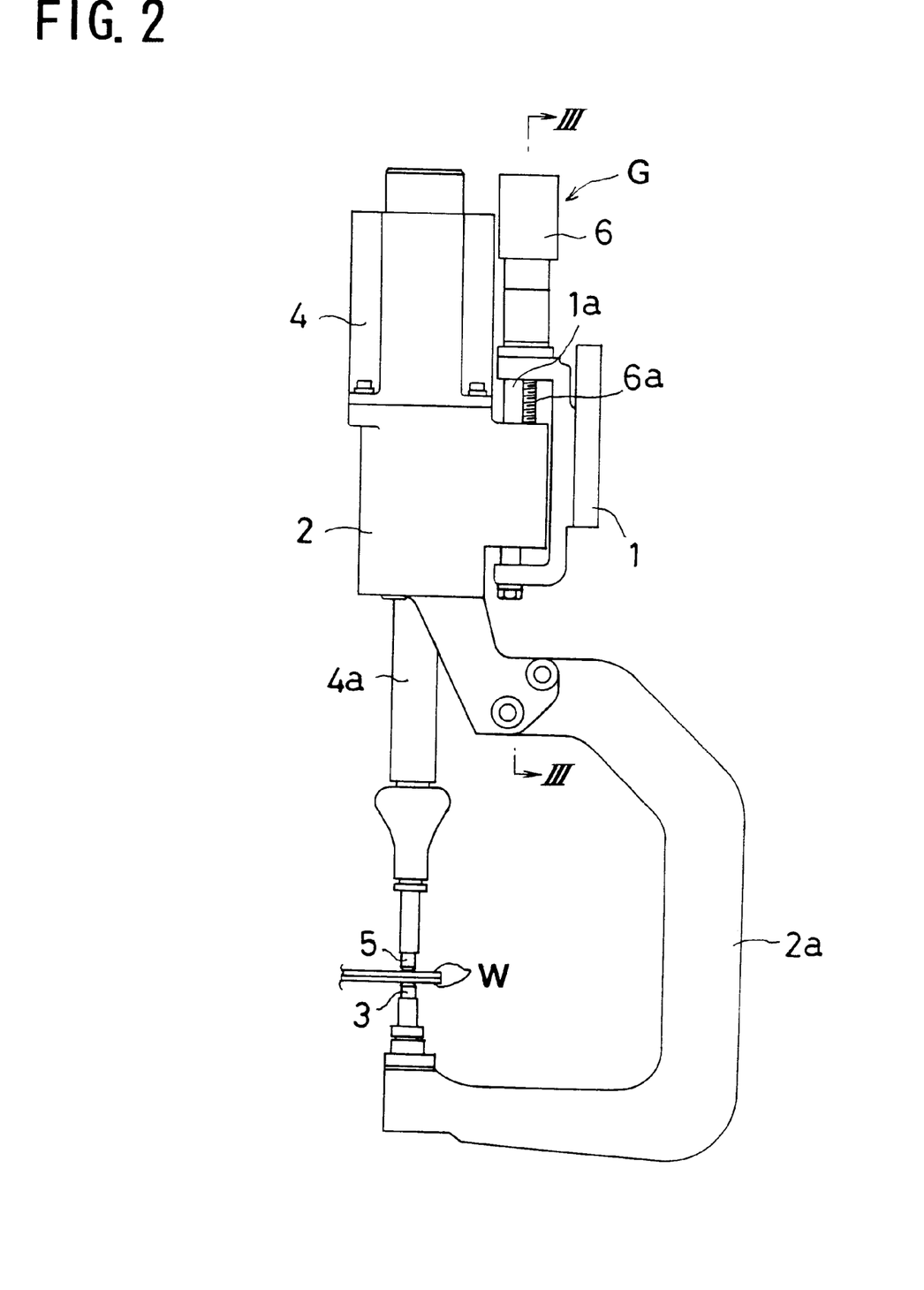
FIG. 2 is an enlarged side view of the spot welding gun.

The spot welding gun G is provided, as shown in FIG. 2, with a gun main body 2 which is supported on a gun support bracket 1 so as to be movable vertically (i.e., up and down), the gun support bracket 1 being fixed to the wrist Ra. The gun main body 2 is provided with a C-shaped yoke 2a which is elongated downward. A lower electrode tip 3 which serves as a stationary electrode tip is attached to an end of the lower portion of the C-shaped yoke 2a. On an upper end of the gun main body 2 there is mounted a pressing source (i.e., a source for applying an electrode force) 4 which is made up of a servomotor. A rod 4a which is moved up and down by the pressing source 4 via a ball screw (not illustrated) which is disposed inside the gun main body 2 is projected downward of the gun main body 2. To a lower end of the rod 4a there is attached an upper electrode tip 5, which serves as a movable tip, in a manner to face (or lie opposite to) the lower electrode tip 3. A C-shaped spot welding gun is thus constituted by the above-described arrangement.

Figure 3:
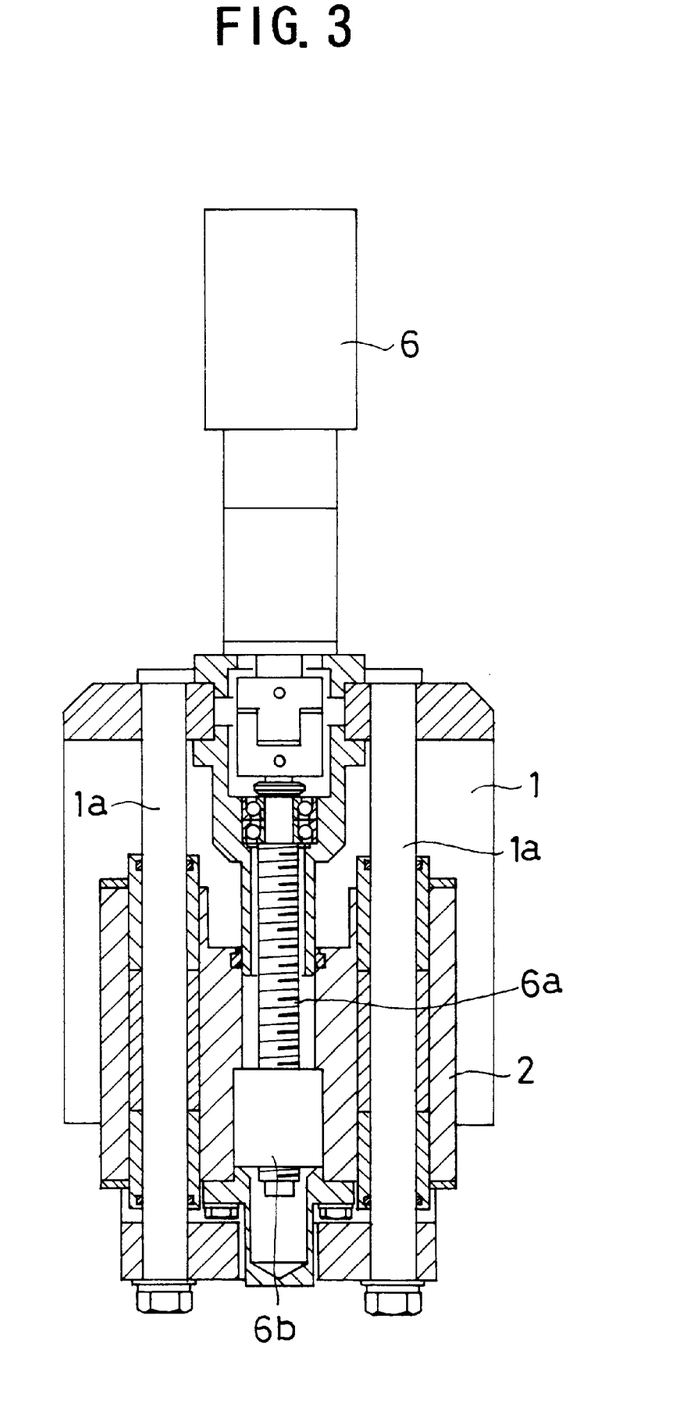
FIG. 3 is a cross-sectional view taken along the line III—III in FIG. 2.

The gun main body 2 is slidably supported, as shown in FIG. 3, by a pair of vertically elongated guide bars 1a which are fixed to the gun support bracket 1. On an upper end of the gun support bracket 1, there is mounted a driving source 6 which is made up of a servomotor. A vertically elongated ball screw 6a which is connected to the driving source 6 is inserted in a threaded (or screwed) manner through a nut 6b which is fixed to the gun main body 2. The gun main body 2 can thus be moved up and down by the driving source 6 via the ball screw mechanism. This ball screw mechanism is arranged such that the weight of the gun main body 2 operates on the ball screw 6a via the nut 6b as a reversing torque.

The pressing source 4 and the driving source 6 are controlled by a gun controller 7. When the spot welding gun G has reached a predetermined weld spot position of the workpiece W by the operation of the robot R, the gun controller 7 controls the pressing of the spot welding gun G by receiving a pressing command from a robot controller 8.

Figure 4:
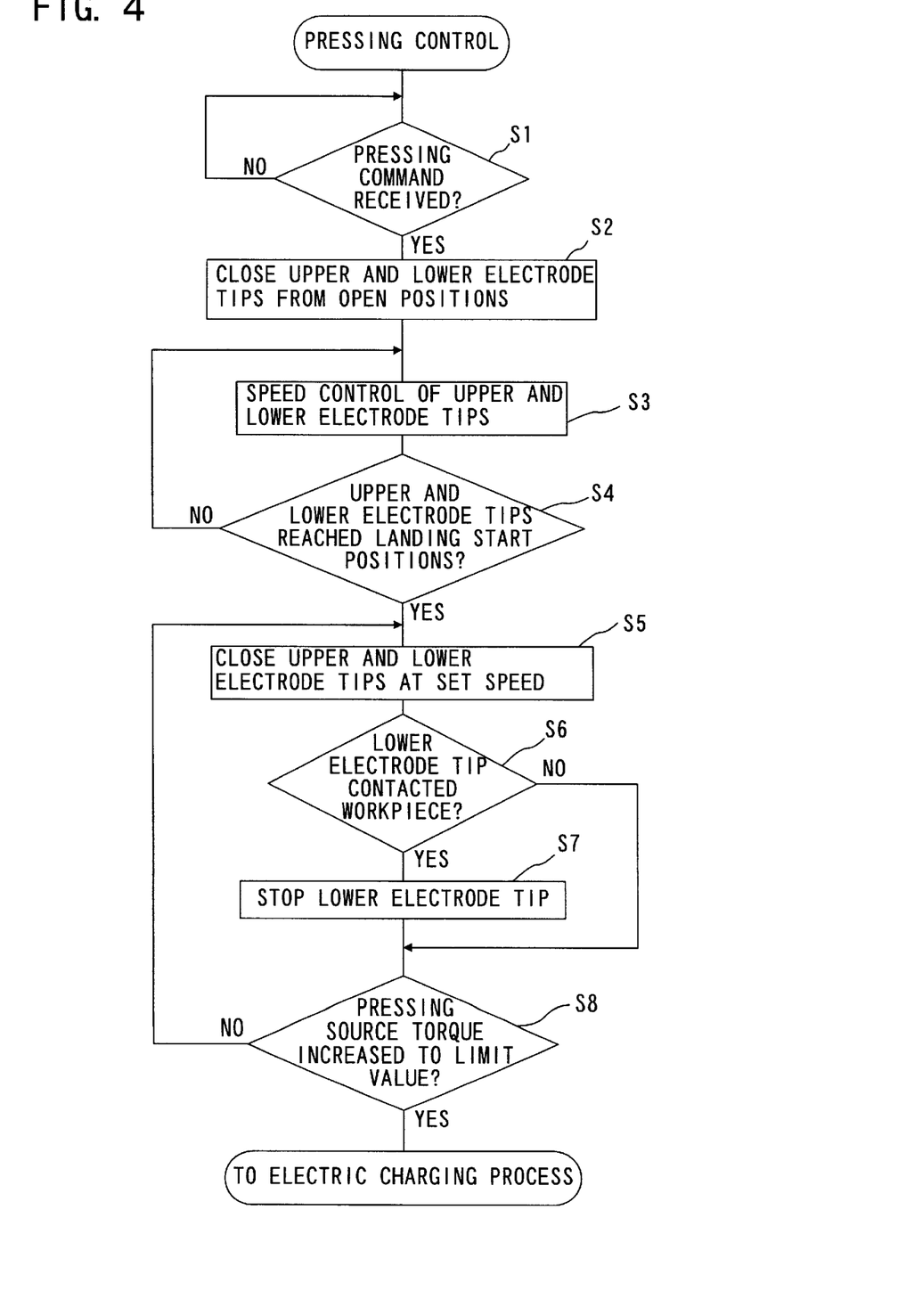
FIG. 4 is a flow chart showing a first control system of controlling the electrode force.
Figure 6:
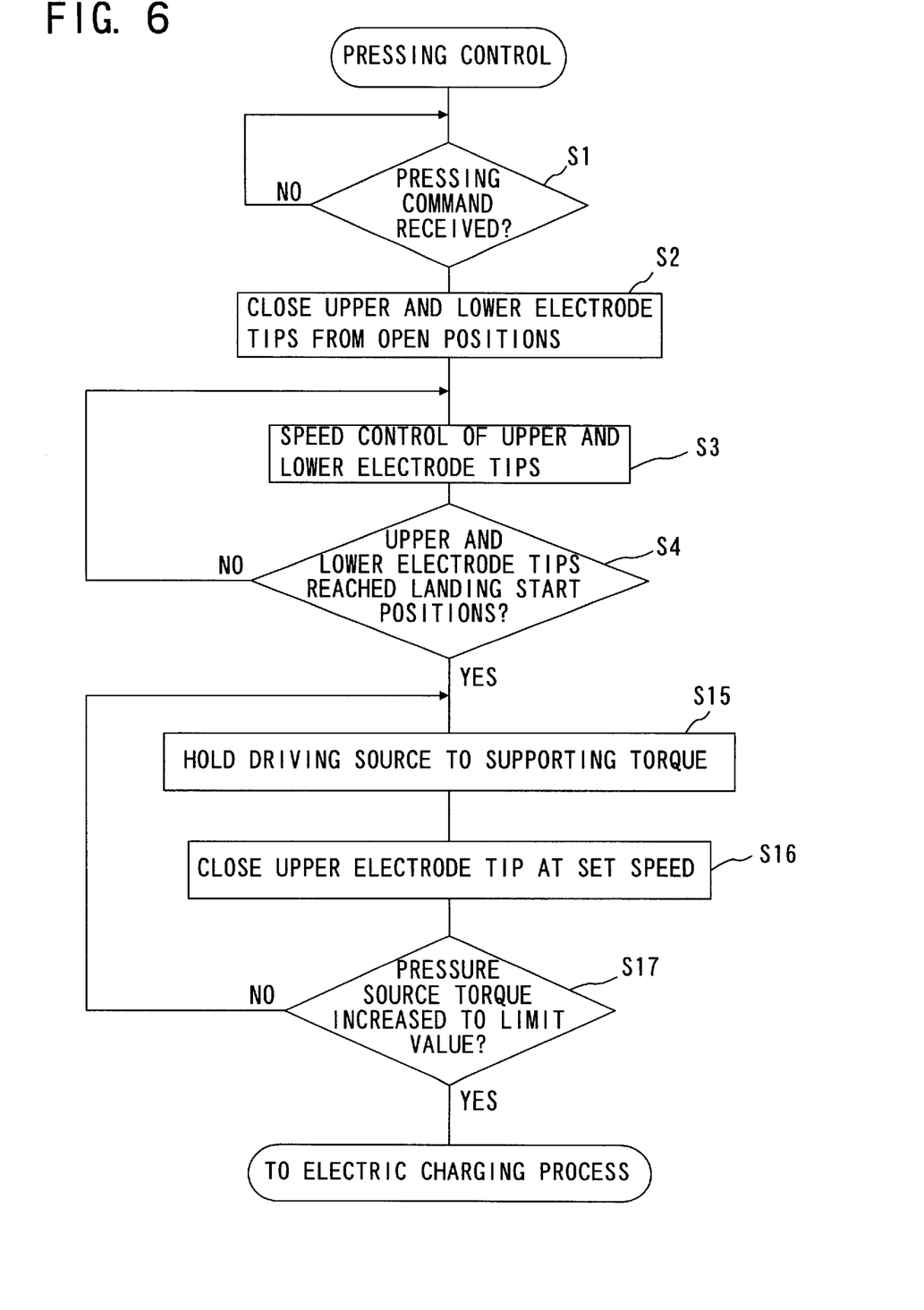
FIG. 6 is a flow chart showing a second control method of controlling the electrode force.

As the pressing control (i.e., the control of applying an electrode force), there are two methods, i.e., one as shown in FIG. 4 and the other as shown in FIG. 6. They will now be explained in detail hereinbelow.

At the time of teaching operation, landing start positions at which both the upper and the lower welding electrode tips 3, 5 are away from the workpiece W by a predetermined distance are set for the lower electrode tip 3 and the upper electrode tip 5, respectively. Also, in order to prevent the upper and the lower electrode tips 3, 5 from interfering with the workpiece W when the spot welding gun G is moved, there are set those open positions for the upper and the lower electrode tips 3, 5 at which these electrode tips are more away from the workpiece W than at the landing start positions. These positional data are stored in the gun controller 7.

In the control method shown in FIG. 4, once the pressing command is received (S1), the upper electrode tip 5 is moved by the pressing source 4 from the open position downward, which is the direction to close both the upper and lower electrode tips (also called the closing direction). At the same time, the lower electrode tip 3 is moved from the open position upward, which is the closing direction, by moving the gun main body 2 upward by the driving source 6 (S2). A speed control is now performed based on those positions of the upper and lower electrode tips 3, 5 which are computed by the amounts of rotation of the pressing source 4 and of the driving source 6 (S3) so that the lower electrode tip 3 and the upper electrode tip 5 reach the respective landing start positions at the same time.

Here, the speed of downward movement of the upper electrode tip 5 relative to the workpiece W is a value which is obtained by subtracting the speed of upward movement of the gun main body 2, i.e., of the lower electrode tip 3 from the speed of downward movement of the upper electrode tip 5 relative to the gun main body 2. Therefore, when the distance between the open position and the landing start position is equal in both the lower electrode tip 3 and the upper electrode tip 5, the speed of downward movement of the upper electrode tip 5 relative to the gun main body 2 is made to be two times the speed of upward movement of the lower electrode tip 3. The lower electrode tip 3 and the upper electrode tip 5 are then able to reach the respective landing start positions at the same time.

Once the lower electrode tip 3 and the upper electrode tip 5 have reached the landing start positions (S4), the lower electrode tip 3 is thereafter moved upward at a set speed VS which is smaller than the speed before the lower electrode tip 3 reached the landing start position and, also, the upper electrode tip 5 is moved downward relative to the gun main body 2 at a relative speed which is equal to the above-described predetermined set speed VS (S5). Then, when the lower electrode tip 3 has come into contact with the workpiece W (S6), the gun main body 2, i.e., the lower electrode tip 3 is stopped, and the lower electrode tip 3 is held to the position of its contact with the workpiece W (S7).

The point of time of contact of the lower electrode tip 3 with the workpiece W can be detected in the following manner. For example, an upper limit value of the driving force (torque) of the driving source 6 is set to such a value that the upward movement of the gun main body 2 is restrained when the stationary electrode tip 3 has slightly contacted the workpiece W (for example, a contact pressure of 5 kgf). In other words, the value in question is one which is obtained by adding a slight or small torque to a supporting (or sustaining) torque which is both necessary and sufficient to support the weight of the gun main body 2. The speed of the upward movement of the gun main body 2 is then detected. The point of time at which this speed has become zero can thus be detected as the point of time at which the lower electrode tip 3 has come into contact with the workpiece W. The supporting torque may vary with the posture of the welding gun G, but the supporting torque which corresponds to the posture of the welding gun G can be obtained by the driving load of the driving source 6.

Even if the upper limit value of the driving torque of the driving source 6 is not set as described hereinabove, the point of time at which the lower electrode tip 3 has come into contact with the workpiece W can be detected by detecting the driving load (electric motor current) of the driving source 6. In other words, when the lower electrode tip 3 has come into contact with the workpiece W, the driving load increases. This point of time of increase can be detected as the point of time of contact. In this case, after the detection of the contact, the driving torque is decreased to the above-described supporting torque. The lower electrode tip 3 is then stopped in a state in which the contact pressure of the lower electrode tip 3 with the workpiece W is substantially made to zero. Also in case the upper limit value of the driving torque is set as described above, it is preferable to decrease the driving torque to the supporting torque after the detection of the contact.

Until the lower electrode tip 3 comes into contact with the workpiece W, the speed of downward movement of the upper electrode tip 5 relative to the gun main body 2 is equal to the speed of upward movement of the gun main body 2. Therefore, the upper electrode tip 5 remains stationary at the landing start position. When the lower electrode tip 3 has contacted the workpiece W and the gun main body 2 has consequently been stopped, the upper electrode tip 5 moves downward from the landing start position at the set speed VS to thereby contact the workpiece W. After it has come into contact with the workpiece W, the electrode force by the pressing source 4 is operated uniformly on the upper electrode tip 5 and on the lower electrode tip 3 via the gun main body 2. Here, the driving torque of the pressing source 4 increases with an increase in the driving load as a result of contact of the upper electrode tip 5 with the workpiece W. There is set a limit value depending on the required electrode force. When the driving torque of the pressing source 4 has increased to the limit value (S8), the program proceeds to the process of charging electricity for welding.

Figure 5A:
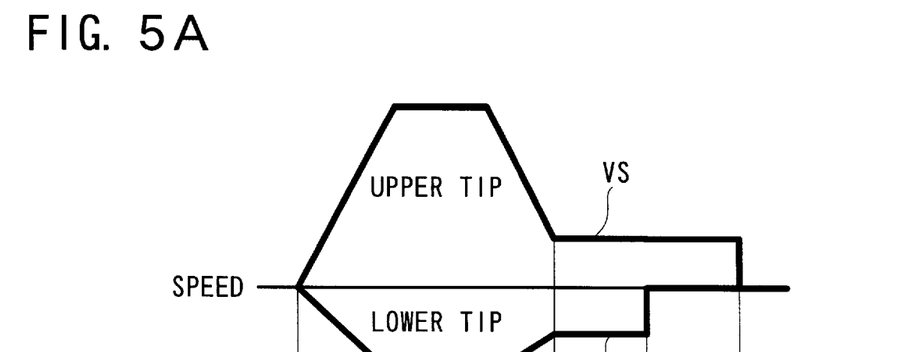
FIG. 5A is a graph showing the change in speed of each electrode tip according to the first control method.
Figure 5B:
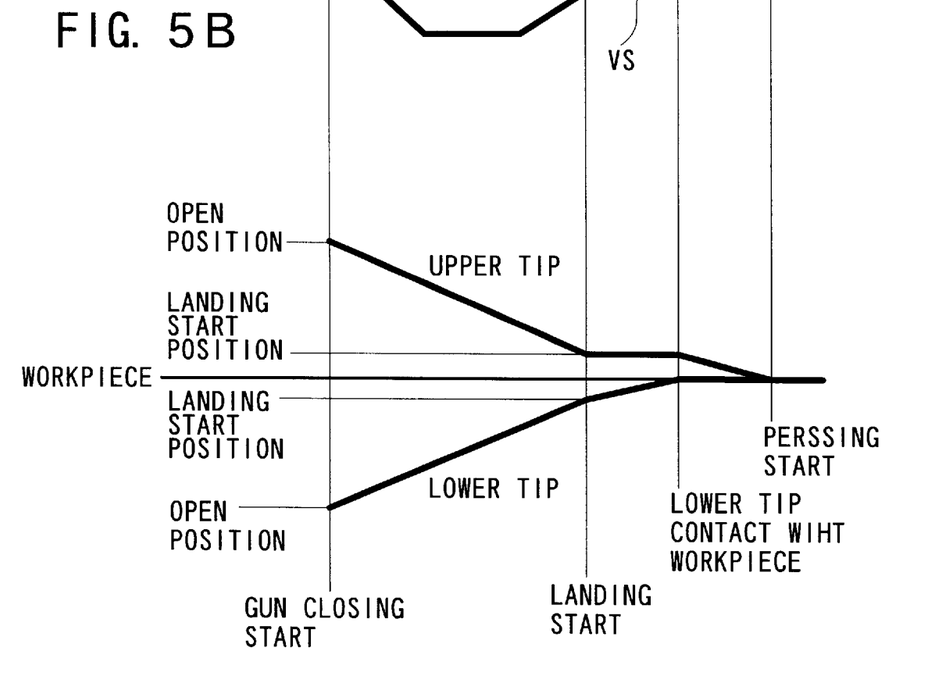
FIG. 5B is a graph showing the change in position of each electrode tip according to the first control method.

The changes in moving speed and the changes in position of each of the electrode tips 3, 5 in the above-described control method are shown in FIGS. 5A and 5B. The moving speed of the upper electrode tip 5 in FIG. 5A is a relative speed relative to the gun main body 2.

According to the above-described control method, the lower electrode tip 3 is held to the position at the point of time of contact with the workpiece W. Therefore, the lower electrode tip 3 will not strongly contact the workpiece W by the driving source 6. The difference between the electrode force of the lower electrode tip 3 to the workpiece W and the electrode force of the upper electrode tip 5 to the workpiece W becomes substantially zero.

Figure 7A:
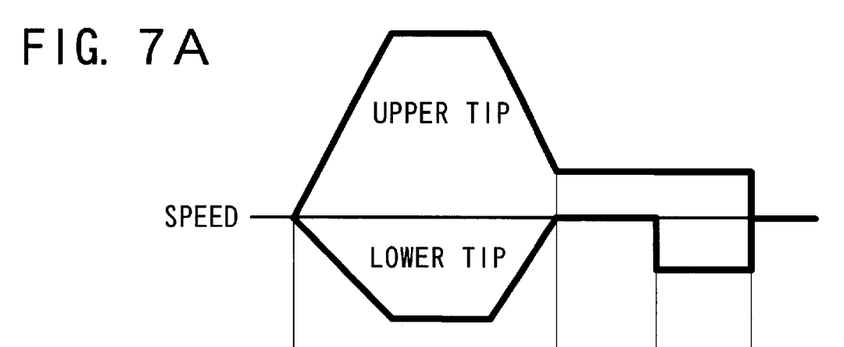
FIG. 7A is a graph showing the change in speed of each electrode tip according to the second control method.

Also in the control method as shown in FIG. 6, the steps S1 through S4 are performed in the same manner as in the above-described control method. In this control method, however, as shown in FIG. 7A, the speed of the lower electrode tip 3 is controlled such that the speed of moving of the lower electrode tip 3 becomes zero when it reaches the landing start position.

Then, when the lower electrode tip 3 and the upper electrode tip 5 have reached the respective landing start positions, the driving torque of the driving source 6 is switched and held to the supporting torque which is both necessary and sufficient to support the weight of the gun main body 2 (S15). In this state, the upper electrode tip 5 is moved downward relative to the gun main body 2 at a speed which is lower than the speed before the upper electrode tip 5 reached the landing start position (S16).

Figure 7B:
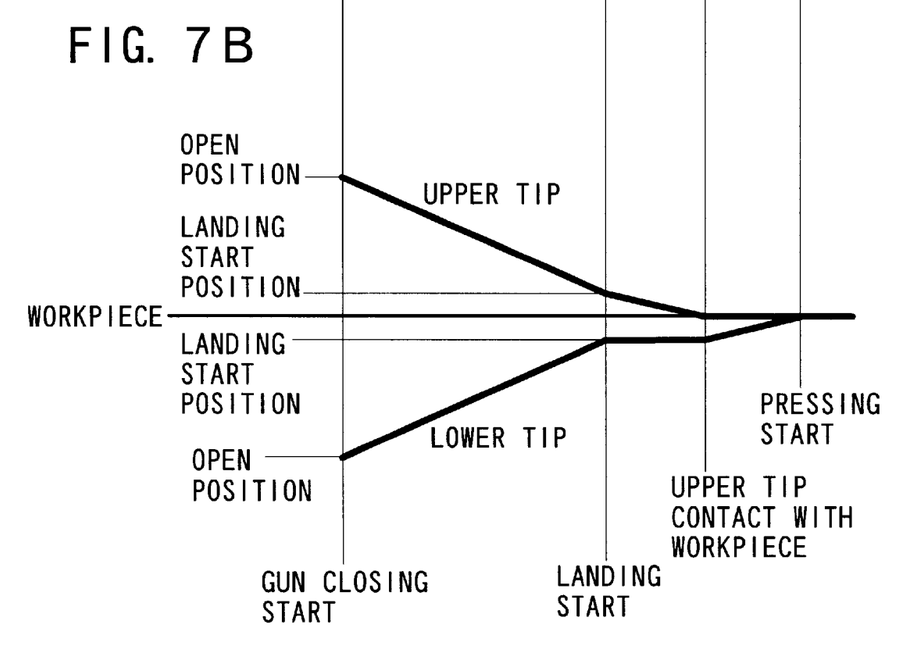
FIG. 7B is a graph showing the change in position of each electrode tip according to the second control method.

According to this arrangement, until the upper electrode tip 5 contacts the workpiece W, the driving source 6 is restrained by the balance between the reversing torque due to the weight of the gun main body 2 and the supporting torque. Therefore, the lower electrode tip 3 does not move from the landing start position as shown in FIG. 7B. When the upper electrode tip 5 has contacted the workpiece W, the reversing torque which operates on the driving source 6 becomes smaller than the supporting torque. As a result, the restraining of the driving source 6 is released, and the lower electrode tip 3 moves upward in accordance with the downward movement of the upper electrode tip 5 relative to the gun main body 2. Then, when the lower electrode tip 3 has contacted the workpiece W, the electrode force by the pressing source 4 operates evenly on the upper electrode tip 5, and on the lower electrode tip 3 via the gun main body 2. When the driving torque of the driving source 4 has increased to the limit value that has been set according to the required electrode force (S17), the program proceeds to the step of charging electricity for welding.

In this control method, the force to be transmitted from the driving source 6 to the gun main body 2 is canceled by the weight of the gun main body 2. The electrode force of the lower electrode tip 3 to the workpiece W by the driving source 6 becomes substantially zero, and the difference between the electrode force of the lower electrode tip 3 to the workpiece W and the electrode force of the upper electrode tip 5 to the workpiece W also becomes substantially zero.

Further, in any one of the above-described control method, as long as the workpiece W is present between the landing start position of the lower electrode tip 3 and the landing start position of the upper electrode tip 5, the electrode force of both the electrode tips 3, 5 become equal to each other due to the operation that is similar to the one as described above. Therefore, these methods can cope with the deviation of the workpiece W relative to the welding gun G due to an error in setting the workpiece W and to an error in positioning the welding robot R.

As described hereinabove, when the electrode forces of both the electrode tips 3, 5 are made even, the contact resistances of both the electrode tips 3, 5 against the workpiece W also become even. As a result, the center of heat generation at the time of electric charging coincides with the welded surfaces of the workpiece W. Thus, as shown in FIG. 9A, the nugget N is formed such that the largest diameter portion coincides with the welded surfaces of the workpiece W. Therefore, the shear welding strength improves and the spattering and/or the adhesion of the electrode tips with the workpiece through melting is less likely to occur.

It is also possible to detect the respective electrode forces of both the electrode tips 3, 5 with sensors such as load cells, or the like, and to control the driving source 6 such that the difference between the electrode forces of both the electrode tips 3, 5 becomes zero.

Figure 8:
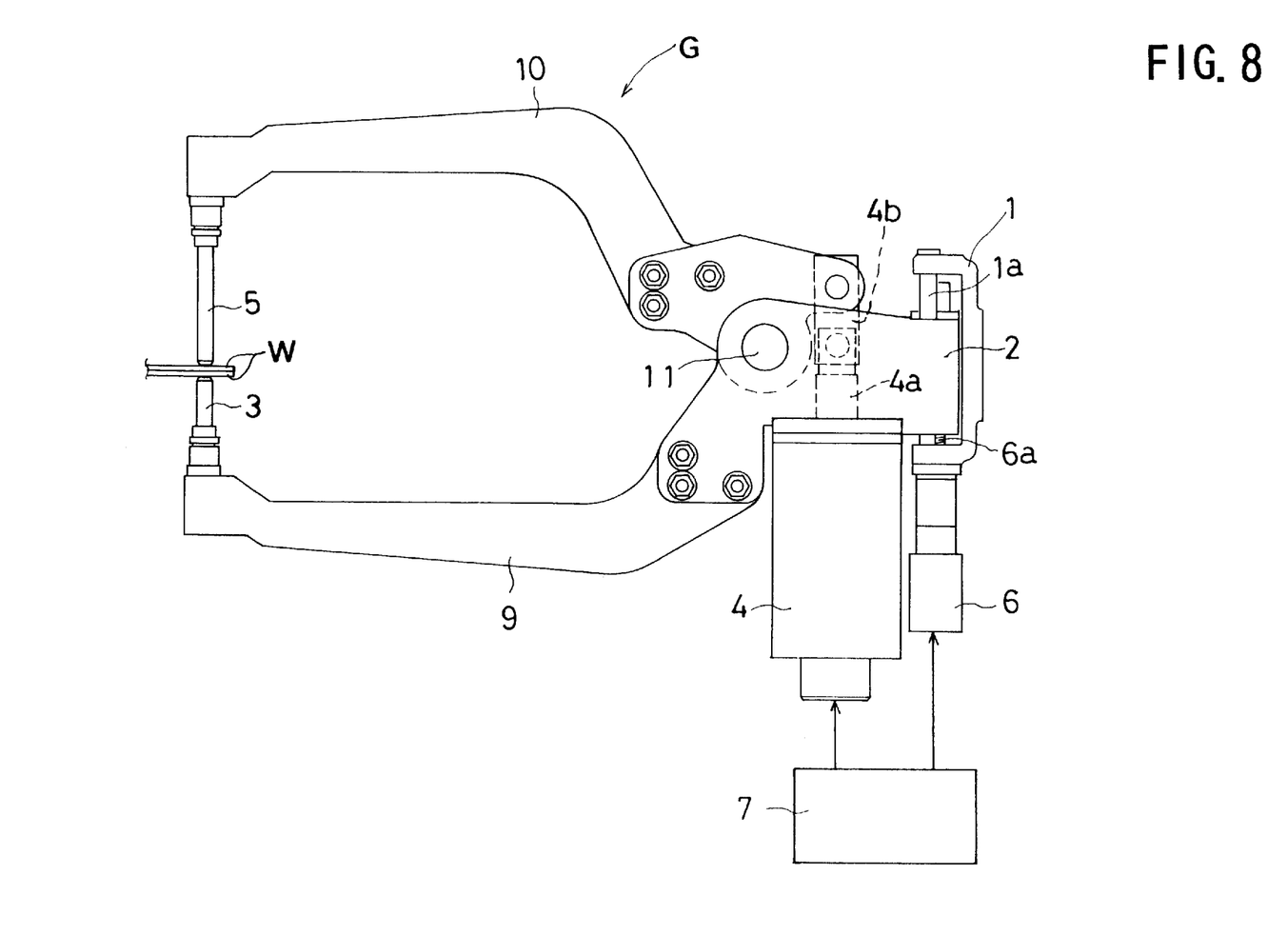
FIG. 8 is a side view of another example of the spot welding gun.

Further, in the above-described embodiments, the spot welding gun G is constituted by a C-shaped gun. However, as shown in FIG. 8, it may be formed into an X-shaped gun. The main differences between this X-shaped gun and the above-described C-shaped gun are as follows. Namely, one difference is that a lower gun arm 9 which is elongated in the back and forth direction is mounted on the gun main body 2 and that the lower electrode tip 3 is mounted on the front end thereof. Another difference is that there is provided an upper gun arm 10 which is elongated in the back and forth direction and to which front end the upper electrode tip 5 is attached, that the upper gun arm 10 is supported, via a pivot shaft 11, on the gun main body 2 so as to be swingable in the vertical direction, and that the base end of the upper gun arm 10 is connected, via a small link 4b, to the rod 4a which is moved up and down by the pressing source 4 to thereby swing the upper gun arm 10 in the vertical direction. The other construction is the same as the C-shaped gun. Therefore, an explanation of the X-shaped gun is omitted by affixing the same reference numerals to the same members as the C-shaped gun.

In this X-shaped gun, too, the electrode forces of both the electrode tips 3, 5 can be made uniform by driving the pressing source 4 and the driving source 6 by the gun controller 7 in the same manner as in the above-described examples.

In the examples shown in FIGS. 2 and 8, the pressing source 4 and the driving source 6 are constituted by servomotors. The present invention can also be applied to an example in which they are constituted by servo cylinders.

It is readily apparent that the above-described method of controlling electrode force meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of controlling an electrode force of a spot welding gun, said spot welding gun comprising:

a gun main body;

a stationary electrode tip which is immovable relative to said gun main body; and a movable electrode tip which is opened and closed by a pressing source relative to said stationary electrode tip, said gun main body being movable relative to a gun support bracket by a driving source in a direction in which both said electrode tips lie opposite to each other, said method comprising the steps of:

controlling said pressing source such that said movable electrode tip is moved by said pressing source from an open position in a closing direction of approaching a workpiece to thereby bring said movable electrode tip into contact with the workpiece and, therefore, that a predetermined electrode force is obtained; and controlling said driving source such that a difference between an electrode force of said stationary electrode tip to the workpiece and the electrode force of said movable electrode tip to the workpiece at the time of pressing the workpiece becomes substantially zero.

2. A method of controlling an electrode force of a spot welding gun according to claim 1, wherein said step of controlling said driving source further comprises the steps of:

moving said stationary electrode tip by the movement of said gun main body by means of said driving source from an open position in a closing direction of approaching the workpiece to thereby bring said stationary electrode tip into contact with the workpiece;

detecting a point of time of contact of said stationary electrode tip with the workpiece; and holding said gun main body to a position at the point of time of said contact.

3. A method of controlling an electrode force of a spot welding gun according to claim 2, further comprising the steps of:

setting an upper limit value of a driving force of said driving source to such a value that the movement of said gun main body is restrained when said stationary electrode tip has slightly contacted the workpiece;

detecting a speed of movement of said gun main body; and detecting a point of time at which said speed of movement becomes zero as said point of time of contact of said stationary electrode tip with the workpiece.

4. A method of controlling an electrode force of a spot welding gun according to claim 2, further comprising the steps of:

detecting a driving load of said driving source; and detecting a point of time of increase in said driving load as said point of time of contact of said stationary electrode tip with the workpiece.

5. A method of controlling an electrode force of a spot welding gun according to any one of claims 2 through 4, further comprising the steps of:

setting a landing start position for each of said stationary electrode tip and said movable electrode tip, said landing start position being away from the workpiece by a predetermined distance;

moving said stationary electrode tip and said movable electrode tip in the closing directions from respective open positions;

after both said electrode tips have reached respective landing start positions, moving said stationary electrode tip in the closing direction at a predetermined set speed which is lower than a moving speed before it reached the landing start position; and moving said movable electrode tip in the closing direction relative to said gun main body at a relative speed which is equal to said set speed.

6. A method of controlling an electrode force of a spot welding gun according to claim 1, wherein said step of controlling said driving source comprises:

moving said stationary electrode tip by a movement of said gun main body by means of said driving source from an open position in a closing direction of approaching the workpiece;

stopping said gun main body when said stationary electrode tip has reached a landing start position which is away from the workpiece by a predetermined distance; and switching a driving force of said driving source to a value which is both necessary and sufficient to support a weight of said gun main body and holding said driving force to said value.

7. A method of controlling an electrode force of a spot welding gun according to claim 6, further comprising the steps of:

setting a landing start position for said movable electrode tip, said landing start position being away from the workpiece by a predetermined distance;

moving said stationary electrode tip and said movable electrode tip from said respective open positions in the closing direction; and after both said electrode tips have reached respective landing start positions, moving said movable electrode tip in the closing direction at a predetermined set speed which is lower than a moving speed before it reached the landing start position.

* * * * *